United States Patent [19]
Maeda et al.

[11] Patent Number: 5,264,749
[45] Date of Patent: Nov. 23, 1993

[54] ELECTRIC MOTOR WITH ADHESIVELY MOUNTED MAGNET YOKE

[75] Inventors: Kenichi Maeda; Youji Maki; Norio Umezawa, all of Takefu, Japan

[73] Assignee: Matsushita Electric Industrial Co., Ltd., Kadoma, Japan

[21] Appl. No.: 805,990

[22] Filed: Dec. 12, 1991

[30] Foreign Application Priority Data

Jan. 24, 1991 [JP] Japan .................... 3-007137

[51] Int. Cl.⁵ .................... H02K 15/03; H02K 5/00
[52] U.S. Cl. .................... 310/154; 310/42; 310/91; 29/607; 29/DIG. 1
[58] Field of Search .................... 310/42, 154, 89, 91, 310/181, 254, 259, 218; 29/DIG. 1, 596, 607; 335/297, 298, 302, 306

[56] References Cited

U.S. PATENT DOCUMENTS

| | | | |
|---|---|---|---|
| 3,663,850 | 5/1972 | Phelon | 310/153 |
| 3,790,830 | 2/1974 | Bonfiglio | 310/42 |
| 4,227,105 | 10/1980 | Kumakura | 310/153 |
| 4,580,072 | 4/1986 | Morishita et al. | 310/154 |
| 4,587,449 | 5/1986 | West | 310/154 |
| 4,594,525 | 6/1986 | Stokes | 310/156 |
| 4,745,319 | 5/1988 | Tomite et al. | 310/154 |
| 4,748,358 | 5/1988 | Rühle et al. | 310/154 |
| 4,795,932 | 1/1989 | Long | 310/154 |
| 4,851,727 | 7/1989 | Tanaka | 310/154 |
| 4,877,986 | 10/1989 | Shimizu | 310/153 |
| 4,933,582 | 6/1990 | Hata et al. | 310/154 |

FOREIGN PATENT DOCUMENTS

| | | |
|---|---|---|
| 1118604 | 7/1968 | Fed. Rep. of Germany ...... 310/154 |
| 3036941 | 9/1980 | Fed. Rep. of Germany . |
| 3135217 | 9/1981 | Fed. Rep. of Germany . |
| 2-37550 | 3/1990 | Japan . |
| 2-101939 | 4/1990 | Japan . |

*Primary Examiner*—Steven L. Stephan
*Assistant Examiner*—D. R. Haszko
*Attorney, Agent, or Firm*—Cushman, Darby & Cushman

[57] ABSTRACT

An electric motor having a cylindrical frame with a thickness less than that of conventional electric motors. A tubular inner yoke is inserted in the cylindrical frame and in combination therewith serves as a magnetic path. The total thickness of the cylindrical frame and the inner yoke serves as a magnetic path substantially the same as that of a conventional electric motor frame. The inner yoke and thinner frame construction of the present invention reduces the total weight of the electric motor as compared with conventional electric motors. Additionally, the inner yoke has a plurality of protrusions for positioning the permanent magnets of the electric motor both axially and circumferentially thereon.

8 Claims, 5 Drawing Sheets

5,264,749

ELECTRIC MOTOR WITH ADHESIVELY MOUNTED MAGNET YOKE

BACKGROUND OF THE INVENTION

1. Field of the Invention

The present invention relates to an improvement of an electric motor, for example, for use in electric components of an automobile.

2. Description of the Prior Art

Accompanying the increased use of electric components in automobiles, more small sized electric motors are used as actuators of electric components.

A conventional small sized electric motor is described referring to FIG. 6. As shown in FIG. 6, a permanent magnet 2 is positioned by a leaf spring 3 and fixed on an inner surface of a frame 1 by adhesive. The leaf spring 3 is calked on the frame 1 by a rivet 4. A shaft 13 of a rotor 5 is rotatively born by bearings 7. And the bearings 7 are held by the frame 1 and a cover 6. A brush holder 8 for holding a brush 9 is pinched between the frame 1 and the cover 6. Furthermore, holes 12 are provided on the frame 1 and the cover 6, through which a screw bolt 11 for fixing the above-mentioned conventional electric motor on a base of an electric component (not shown in the figure) penetrates. When an electric current is supplied to windings 5a of the rotor 5 via the brush 9 and a commutator 10, the rotor 5 starts to rotate.

In the above-mentioned conventional electric motor, it is necessary to make the frame serving as a magnetic path sufficiently thick for allowing magnetic fluxes of the magnet 2 effectively therethrough. The weight of the conventional electric motor has been unnecessarily heavy, since some parts of the frame 1 which need not serve as the magnetic path are thick.

Furthermore, hitherto the screw bolt(s) 11 is(are) used for fixing the above-mentioned conventional electric motor to a base of the electric component (not shown in the figure). The screw bolt(s) 11, however, is(are) magnetically attracted to the magnet(s) 2 when the screw bolt(s) 11 is(are) inserted into an inner space of the conventional electric motor. And thereby, the fixing process of the conventional electric motor is very difficult.

SUMMARY OF THE INVENTION

Purpose of the present invention is to solve the above-mentioned problems and to provide an improved electric motor which is light weight, and can be easily fixed to a base of an electric component.

An electric motor in a accordance with the present invention comprises:

a cylindrical frame having as small thickness giving only a demanded mechanical strength; and a tube-shaped yoke inserted in the frame and including, plural first magnet positioning protrusions of press-bent configuration formed on a first end of the yoke in an inward-radial direction for positioning magnets in the yoke;

plural second magnet positioning protrusions which are formed by cutting a side wall of the yoke and bending the cut part to the inner surface for positioning the magnet thereon in circumferential direction of the motor;

plural screw bolt guides which are formed by cutting the side wall of the yoke on the same lines as those of the second magnet positioning protrusions in the axial direction of the motor in the vicinity of a second end of the yoke and bending the cut part inward of the yoke, and having a sufficient bending angle for guiding a screw bolt;

plural stoppers which are formed protruding in the axial direction of the motor from the first end of the yoke and have an inward-bent part for contacting a closed end of the frame for stopping the yoke in a predetermined position; and plural holes which are formed on respective of parts of the inner surface of the yoke where the magnets are to be fixed and wherethrough an adhesive is supplied for simultaneous fixings of the magnet to the yoke and the yoke to the frame.

In the electric motor configured as above, the inner yoke is used a part of the magnetic path. Therefore, the thickness of the frame can be thinner as with much of the mechanical strength maintained. Furthermore, the weight of the electric motor can be reduced. A pair of screw bolt guides oppose each other, and serve as a guide for a screw bolt. The screw bolt can thus penetrate the inner space of the electric motor, smoothly.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the figures are schematic representations for purposes of illustration and do not necessarily depict the actual relative sizes or locations of the elements shown.

DESCRIPTION OF THE PREFERRED EMBODIMENT

An electric motor in accordance with the present invention is described referring to FIGS. 1, 2, 3, 4 and 5.

Figure 1:
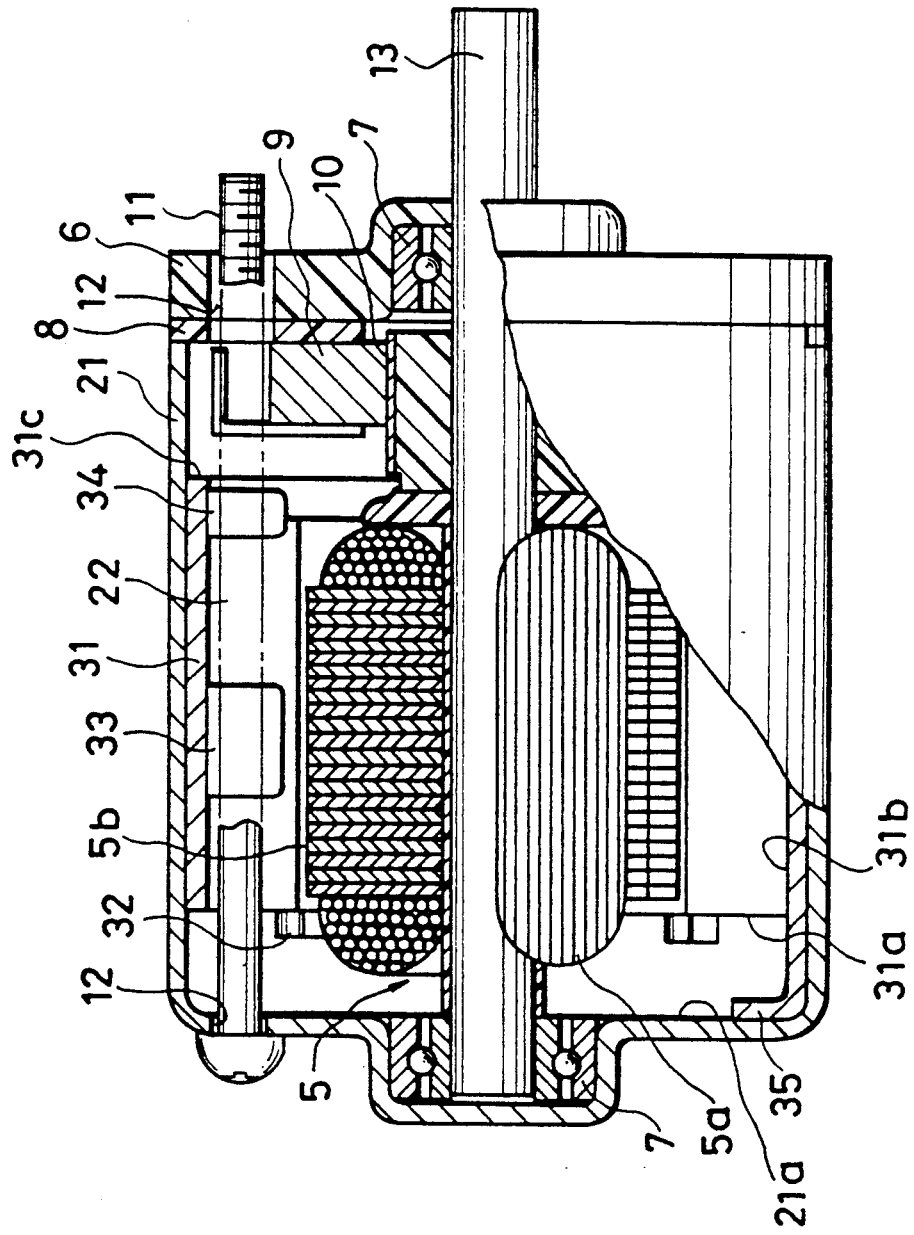
FIG. 1 is a cross-sectional side view of an electric motor in accordance with the present invention.
Figure 2:
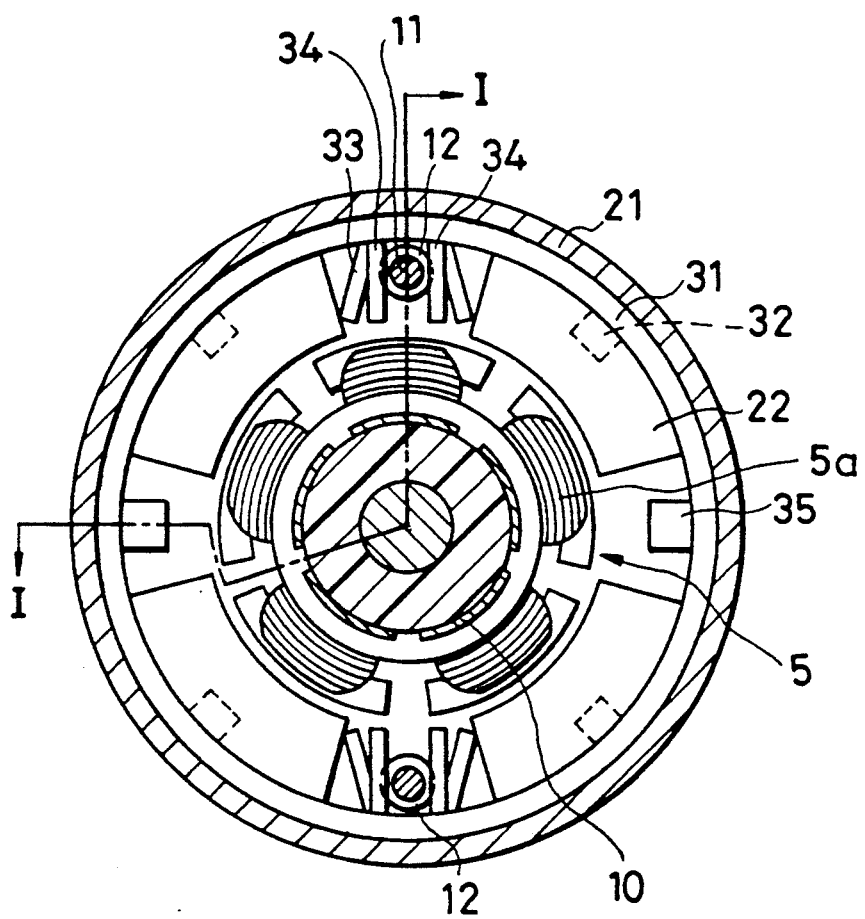
FIG. 2 is a cross-sectional front view of the electric motor shown in FIG. 1.
Figure 3:
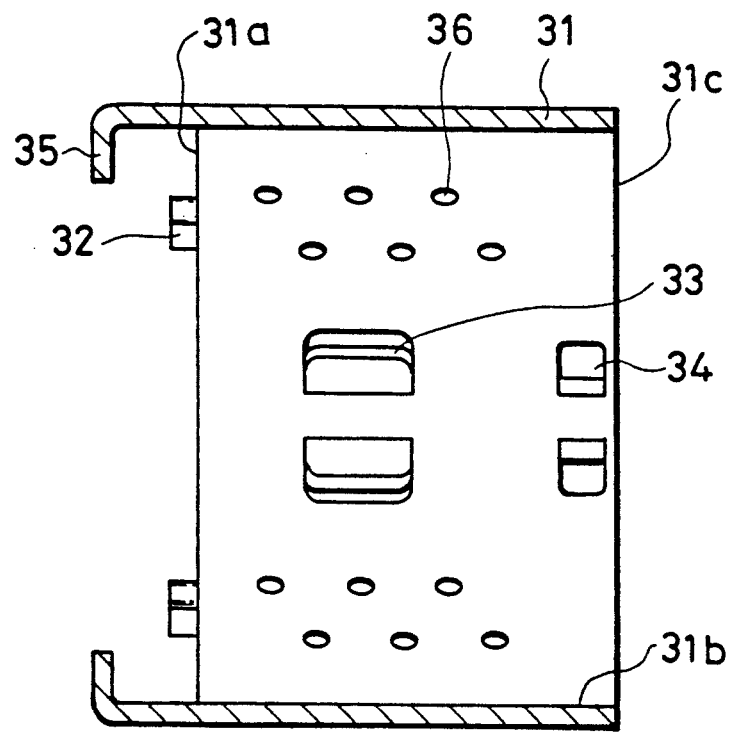
FIG. 3 is a cross-sectional side view of an inner yoke used in the electric motor shown in FIGS. 1 and 2.
Figure 4:
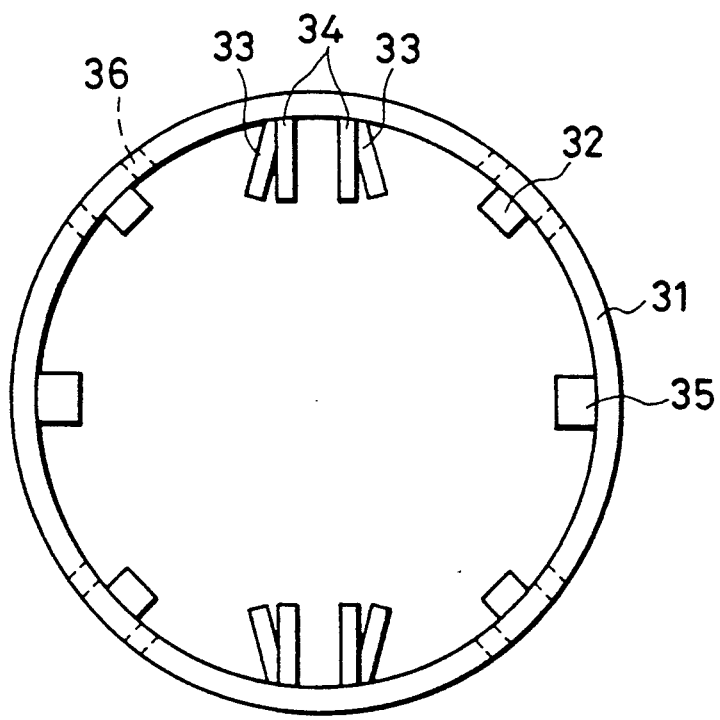
FIG. 4 is a front view of the inner yoke shown in FIG. 3.
Figure 5:
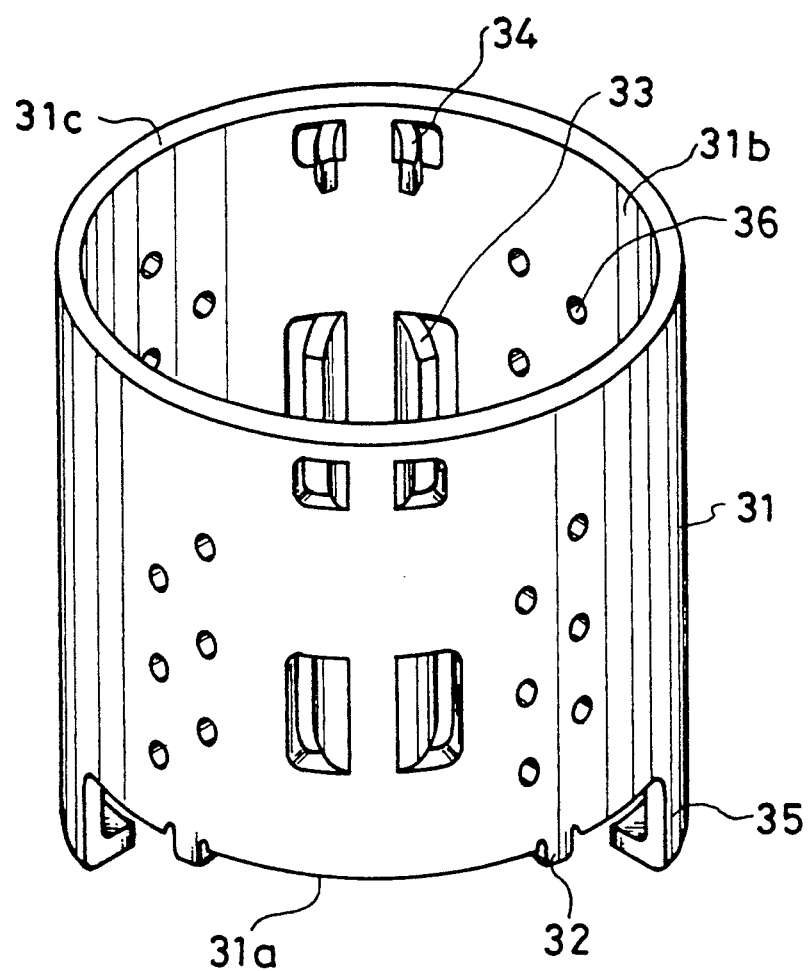
FIG. 5 is a perspective view of the inner yoke shown in FIGS. 3 and 4.

FIG. 1 shows I—I section of FIG. 2. In FIG. 1, an inner yoke 31 is inserted into a frame 21. The frame 21 is substantially cylinder-shaped and the inner yoke 31 is substantially tube-shaped. The outer diameter of the inner yoke 31 is substantially the same as but slightly smaller than the inner diameter of the frame 21. A shaft 13 of a rotor 5 is rotatively born by bearings 7. And the bearings 7 are held by the frame 21 and a cover 6. A brush holder 8 for holding a brush 9 is held pinched between the frame 21 and the cover 6. Furthermore, holes 12 (shown in FIG. 2) are provided on the frame 21 and the cover 6, through which a screw bolt 11 for fixing the electric motor on a base of an electric component (not shown in the figure) is penetrated. When an electric current is supplied to windings 5a of the rotor 5 via the brush 9 and a commutator 10, the rotor 5 starts to rotate.

As shown in FIGS. 1, 2, 3, 4 and 5, the inner yoke 31 has plural first magnet positioning protrusions 32, which are for positioning a magnet 22 in the axial direction of the electric motor, and also has plural second magnet positioning protrusions 33, which are for positioning the magnets 22 in a circumferential direction of the electric motor. The first magnet positioning protrusions 32 are formed by bending protrusions on a first end 31a of the inner yoke 31 in radial direction. The second magnet positioning protrusions 33 are formed by cutting of the side wall of the inner yoke 31 and bending the cut parts to the inner surface 31b of the inner yoke 31. Furthermore, the inner yoke 31 has plural screw bolt guides 34, which are formed by cutting and bending the side wall of the inner yoke 31 on the same lines as those of the second magnet positioning protrusions 33 in the axial direction of the motor, and in the vicinity of a second end 31c of the inner yoke 31. The screw bolt guide 34 is bent by 90 degrees or more in order to guide the screw bolt 11 against the magnetic attraction force by the permanent magnets 22.

On the first end 31a of the inner yoke 31, plural stoppers 35 are formed protruding in the axial direction of the motor to contact the closed end 21a of the frame 21, thereby accurately positioning the inner yoke 31 in the axial direction of the tubular inner space of the frame 21. On several parts of the inner yoke 31 where the magnets 22 are to be positioned, holes 36 are formed. Adhesive is supplied through the holes 36 to the magnet 22 for bonding on the inner yoke 31. At the same time, the inner yoke 31 is bonded on the inner surface of the frame 21, since the adhesive is supplied also on the inner face of the frame 21 through the holes 36.

As is obvious from FIG. 1, the inner yoke 31 with the magnets 22 is accurately positioned for facing the core 5b of the rotor 5 in the axial direction of the electric motor effectively forming the magnetic path as designed.

Figure 6:
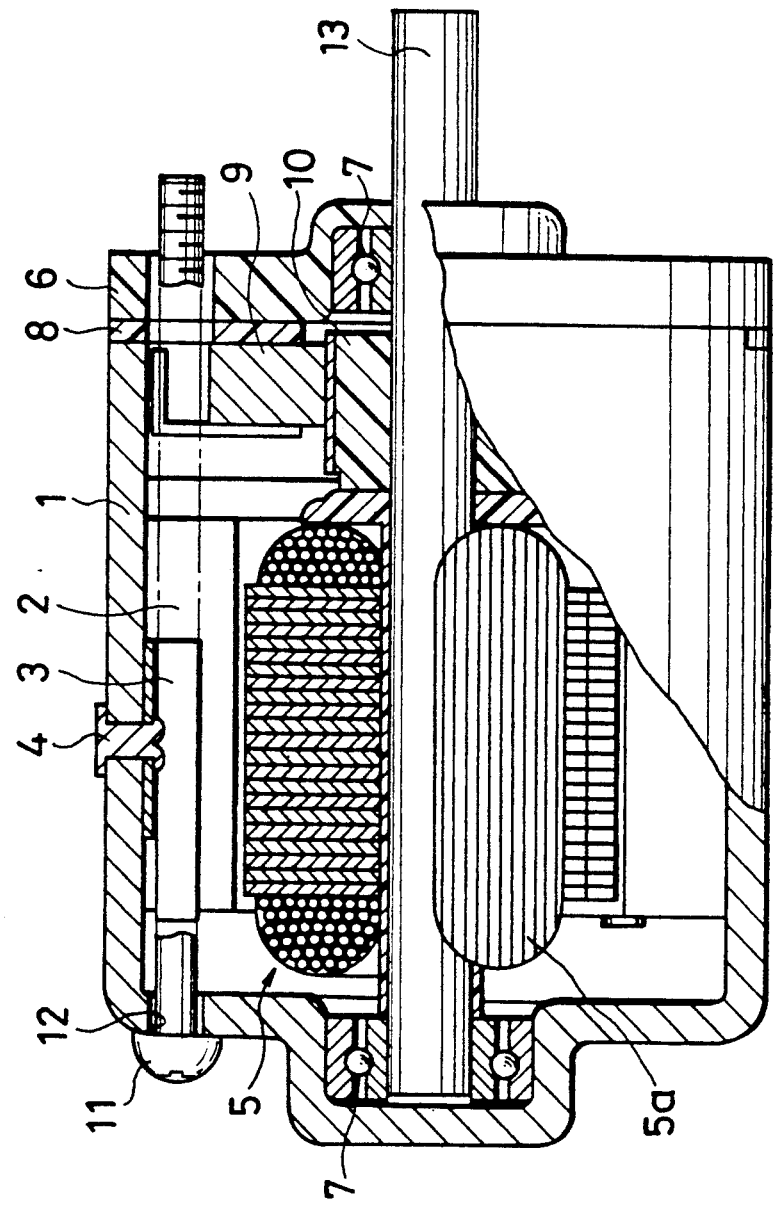
FIG. 6 is the cross-sectional side view of the conventional electric motor.

When the electric motor in accordance with the present invention shown in FIG. 1 is compared with the conventional electric motor shown in FIG. 6, the thickness of the frame 21 can be made thinner than that of the conventional frame 1. The total thickness of the frame 21 and the inner yoke 31, at those parts necessary to serve as a magnetic path, however, is substantially the same as that of the conventional frame 1 (shown in FIG. 6). Because the thickness of the frame 21 of the electric motor in accordance with the present invention shown in FIG. 1 is thinner than that of the frame 1 of the conventional electric motor shown in FIG. 6, the total weight of the electric motor in accordance with the present invention becomes much lighter than that of the conventional electric motor.

The gap between a pair of opposing screw bolt guides 34 is selected substantially the same as but a little wider than the diameter of the screw bolt 11. This enables the screw bolt guides 34 to guide the screw bolt 11 so that the screw bolt 11 easily penetrates through the inner space of the electric motor without being effected by the magnet 22. By providing the screw bolt guides 34, the screw bolt 11 can be set uneffected by the magnetic attraction force of the magnets 22.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An electric motor comprising:
   a cylindrical frame having a thickness sufficient to serve as a mechanical frame for said electric motor; and
   a tubular inner yoke for supporting magnets having a thickness and being inserted in said cylindrical frame, a total thickness of said cylindrical frame and said inner yoke serving as a magnetic path, and respective parts of an inner surface of said inner yoke where magnets are to be fixed having a plurality of holes formed therein, and wherethrough said holes an adhesive is supplied for simultaneously fixing said magnets to said inner yoke and said inner yoke to said cylindrical frame.

2. The electric motor of claim 1, wherein said inner yoke comprises:
   plural first magnet positioning protrusions of press-bent configuration formed on a first end of said inner yoke in an inward-radial direction, said first magnet positioning protrusions for positioning magnets in an axial direction of said electric motor; and
   plural second magnet positioning protrusions formed by cutting a side wall of said inner yoke and inwardly bending the cut part, said second magnet positioning protrusions for positioning magnets in a circumferential direction of said electric motor.

3. The electric motor of claim 1, wherein said inner yoke comprises plural screw bolt guides formed by cutting a side wall of said inner yoke and inwardly bending the cut part, said screw bolt guides being formed in opposing pairs in an axial direction of said electric motor near an end of said inner yoke and having a sufficient bending angle for guiding a screw bolt.

4. The electric motor of claim 1, wherein said inner yoke comprises plural stoppers formed protruding in an axial direction of said electric motor from a first end of said inner yoke, and having an inwardly bent part for contacting a closed end of said cylindrical frame to stop said inner yoke in a predetermined position.

5. The electric motor of claim 2, wherein said inner yoke further comprises plural screw bolt guides formed by cutting said side wall of said inner yoke and inwardly bending the cut part, said screw bolt guides being formed in opposing pairs in axial alignment with said first magnet positioning protrusions near a second end of said inner yoke and having a sufficient bending angle for guiding a screw bolt.

6. The electric motor of claim 2, wherein said inner yoke further comprises plural stoppers formed protruding in said axial direction of said electric motor from said first end of said inner yoke, and having an inwardly bent part for contacting a closed end of said cylindrical frame to stop said inner yoke in a predetermined position.

7. The electric motor of claim 2, wherein opposing screw bolt guides have a gap which is slightly wider than a diameter of a screw bolt.

8. The electric motor of claim 5, wherein said inner yoke further comprises plural stoppers formed protruding in said axial direction of said electric motor from said first end of said inner yoke, and having an inwardly bent part for contacting a closed end of said cylindrical frame to stop said inner yoke in a predetermined position.

* * * * *